(12) United States Patent
Liu et al.

(10) Patent No.: US 9,264,917 B2
(45) Date of Patent: Feb. 16, 2016

(54) WIRELESS ACCESS METHOD, DEVICE, AND SYSTEM

(71) Applicant: Huawei Technologies Co., Ltd., Shenzhen (CN)

(72) Inventors: Sheng Liu, Shenzhen (CN); Rongdao Yu, Shenzhen (CN); Tao Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 13/713,562

(22) Filed: Dec. 13, 2012

(65) Prior Publication Data

US 2013/0102305 A1 Apr. 25, 2013

Related U.S. Application Data

(63) Continuation of application No. PCT/CN2011/073934, filed on May 11, 2011.

(30) Foreign Application Priority Data

Jun. 13, 2010 (CN) .......................... 2010 1 0204990

(51) Int. Cl.
*H04W 4/00* (2009.01)
*H04W 24/02* (2009.01)
(Continued)

(52) U.S. Cl.
CPC ............. *H04W 24/02* (2013.01); *H04L 1/0025* (2013.01); *H04B 7/024* (2013.01); *H04L 5/0037* (2013.01);
(Continued)

(58) Field of Classification Search
CPC . H04W 36/18; H04W 52/40; H04W 72/1226; H04W 24/10

USPC ................. 455/422.1, 507, 515, 517
See application file for complete search history.

(56) References Cited

U.S. PATENT DOCUMENTS 7,773,947 B2 * 8/2010 Gerlach ....................... 455/63.1
8,654,658 B2 * 2/2014 Mori ............................ 370/252
(Continued)

FOREIGN PATENT DOCUMENTS

| CN | 101500297 A | 8/2009 |
| CN | 101610557 A | 12/2009 |
| CN | 101895990 A | 11/2010 |

OTHER PUBLICATIONS

Office Action issued in corresponding Chinese Patent Application No. 201010204990.2, mailed Feb. 28, 2012.
(Continued)

*Primary Examiner* — Charles Appiah
*Assistant Examiner* — Jaime Holliday
(74) *Attorney, Agent, or Firm* — Brinks Gilson & Lione

(57) ABSTRACT

Embodiments of the present invention disclose a wireless access method, device, and system. The method includes: sending pilot signal strength or channel characteristics to a central processing node, where the pilot signal strength or channel characteristics are fed back by a user terminal within the coverage area of a wireless access node and are between the wireless access node and the corresponding user terminal; receiving access indication information of the user terminal, which is fed back by the central processing node and is determined according to the pilot signal strength or channel characteristics, where the access indication information of the user terminal includes an identifier of the wireless access node connected with the user terminal and a corresponding coding and modulation scheme; and sending the identifier of the wireless access node connected with the user terminal and the corresponding coding and modulation scheme to the corresponding user terminal.

9 Claims, 6 Drawing Sheets

(51) Int. Cl.
*H04L 1/00* (2006.01)
*H04W 72/12* (2009.01)
*H04W 36/18* (2009.01)
*H04W 52/40* (2009.01)
*H04W 24/10* (2009.01)
*H04L 5/00* (2006.01)
*H04B 7/02* (2006.01)
*H04W 48/20* (2009.01)
*H04W 74/00* (2009.01)

(52) U.S. Cl.
CPC ............ *H04L 5/0046* (2013.01); *H04L 5/0073* (2013.01); *H04W 24/10* (2013.01); *H04W 36/18* (2013.01); *H04W 48/20* (2013.01); *H04W 52/40* (2013.01); *H04W 72/1226* (2013.01); *H04W 74/002* (2013.01)

(56) References Cited

U.S. PATENT DOCUMENTS

| | | | |
|---|---|---|---|
| 2003/0104786 A1* | 6/2003 | Jung et al. | 455/67.1 |
| 2006/0286996 A1* | 12/2006 | Julian et al. | 455/522 |
| 2007/0117518 A1* | 5/2007 | Cai et al. | 455/67.13 |
| 2008/0227461 A1 | 9/2008 | Dayal et al. | |
| 2009/0111469 A1 | 4/2009 | Lee et al. | |
| 2009/0186626 A1 | 7/2009 | Raghothaman | |
| 2009/0196174 A1 | 8/2009 | Ji | |
| 2010/0248738 A1* | 9/2010 | Chayat et al. | 455/453 |
| 2011/0116476 A1* | 5/2011 | Lee | H04W 52/241 370/331 |

OTHER PUBLICATIONS

Office Action issued in corresponding Chinese Patent Application No. 201010204990.2, mailed Sep. 21, 2012.

International Search Report issued in corresponding PCT Patent Application No. PCT/CN2011/073934, mailed Aug. 18, 2011.

Written Opinion of the International Searching Authority issued in corresponding PCT Patent Application No. PCT/CN2011/073934, mailed Aug. 18, 2011.

Extended European Search Report issued in corresponding European Patent Application No. 11795055.0, mailed Jun. 5, 2013.

Texas Instruments, "Aspects of Coordinated Multi-point Transmission for Advanced E-UTRA" Agenda Item 11, 3GPP TSG RAN WG1 #54bis. Prague, Czech Republic, Sep. 29-Oct. 3, 2008, 5 pages.

* cited by examiner

US 9,264,917 B2

WIRELESS ACCESS METHOD, DEVICE, AND SYSTEM

CROSS-REFERENCE TO RELATED APPLICATIONS

This application is a continuation of International Application No. PCT/CN2011/073934, filed on May 13, 2011, which claims priority to Chinese Patent Application No. 201010204990.2, filed on Jun. 13, 2010, both of which are hereby incorporated by reference in their entireties.

FIELD OF THE INVENTION

The present invention relates to the field of communications technologies, and in particular, to a method, a device, and a system for wireless access.

BACKGROUND OF THE INVENTION

In a conventional macro cellular system, the radius of a cell ranges from several hundreds of meters to several thousands of kilometers, and usually a user terminal is served by one cell. Meanwhile, in a cell, strength of received signals is different. According to different signal strength at the locations of user terminals, user terminals may be classified into two different types: user terminals located at a cell center and user terminals at a cell edge. The user terminals located at the cell center, due to good received signals and a high signal to interference plus noise ratio (Signal to Interference plus Noise Ratio, SINR), may receive a service transmitted at a high rate; the user terminals located at the cell edge can only receive the simplest service because the signals are poor and subject to interference of the signals of a neighboring cell and the service throughput is low. In an era of voice services only, the above macro cellular system may satisfy the basic requirement of a user, but with the development of new wireless services, such as wireless Internet, requirements on the wireless communication system capacity are higher and higher. The macro cellular system of a large radius cannot satisfy growing service requirements, and in particular, the requirements of anytime online services. Due to the existence of users at the cell edge, the overall service capacity is limited. Therefore, the cell radius becomes smaller with the increase of the service capacity. In hot areas (such as office buildings and central business districts), the cell radius is gradually reduced to about 50-100 meters. The conventional macro cell develops toward a smaller micro cell and a pico cell.

In addition, in the conventional cellular system, the height of an antenna is dozens of meters to one hundred meters, and the model of a cell may be simplified as an elliptical or hexagonal cell model. There are apparent differences between different cells. In the structure of a micro cell or a pico cell, and typically the coverage of an office building, to provide better services, a base station is placed at heights (for example, placed on a roof or tower, but this already cannot meet the requirements. The distribution of base stations is flat distribution, and the height may be a dozen meters or the distance between floors of a building. One user terminal UE may receive signals from N base stations nearby (several base stations or several dozens of base stations) (Base Stations, BSs), and the signals sent by the UE may also be received and processed by the N base stations nearby. In this case, the form of the base station changes, and may not be a base station with complete functions in the sense of a conventional macro cell, but a distributed mini base station, a distributed antenna over a fiber, a conventional wireless relay (Relay) station, or an amplifier, or may be different virtual base stations formed by the same base station through the beams of a smart antenna. These base stations may be uniformly referred to as wireless access nodes (Access Nodes, ANs).

One UE may receive service data sent by several BSs nearby, and the signals sent by one UE may be received by several BSs nearby. If multiple UEs in the system share the same channel resources (this is a common application scenario), great interference is caused between information that is sent to different UEs, and great interference is also caused to the uplink data that is sent by different UEs and received by the same BS. FIG. 1 is a schematic diagram of a conventional grid wireless access system. As shown in FIG. 1, when the BS_1 sends data to the UE_1 or receives data from the UE_1, interference may be caused to the UE_2 that uses the same channel to send or receive data. If the distance between different wireless access nodes is short, the interference problem is serious, and the normal work of the system is affected. The technologies used to solve inter-cell interference include interference randomization and interference cancellation, fractional frequency reuse (Fractional Frequency Reuse, FFR), multi-user MIMO (Multi-User MIMO), and so on. However, all these conventional solutions for solving inter-cell interference aim at a macro cell and cannot effectively reduce the interference in a grid wireless access system where the wireless access nodes in micro cells of a small radius are close to each other.

SUMMARY OF THE INVENTION

The present invention provides a wireless access method, device, and system to overcome the disadvantages of serious interference and reduce the interference when the distance between wireless access nodes is short in the prior art.

In an embodiment, the present invention provides a wireless access method, which includes:
  sending pilot signal strength or channel characteristics to a central processing node, where the pilot signal strength or channel characteristics are fed back by a user terminal within the coverage area of a wireless access node and are between the wireless access node and the corresponding user terminal;
  receiving access indication information of the user terminal which is fed back by the central processing node and determined according to the pilot signal strength or channel characteristics, where the access indication information of the user terminal includes an identifier of the wireless access node connected with the user terminal and a corresponding coding and modulation scheme; and
  sending the identifier of the wireless access node connected with the user terminal and the corresponding coding and modulation scheme to the corresponding user terminal.

In an embodiment, the present invention provides another wireless access method, which includes:
  receiving pilot signal strength or channel characteristics sent by a wireless access node, where the pilot signal strength or channel characteristics are fed back by a user terminal within a coverage area or detected by the wireless access node, and are between the wireless access node and the corresponding user terminal;
  determining access indication information of the user terminal according to the pilot signal strength or channel characteristics, where the access indication information of the user terminal includes an identifier of the wireless access node connected with the user terminal and a corresponding coding and modulation scheme; and sending the identifier of the wireless access node connected with the user terminal and the corresponding coding and modulation scheme to the corresponding user terminal through the wireless access node.

In an embodiment, the present invention provides another wireless access method, which includes:

receiving access indication information, which is returned by a wireless access node and is determined by a central processing node according to pilot signal strength or channel characteristics between the home wireless access node and a corresponding user terminal, where the access indication information includes an identifier of the wireless access node connected with the user terminal and a corresponding coding and modulation scheme; and sending or receiving service data to or from the wireless access node corresponding to the identifier of the wireless access node according to the identifier of the wireless access node connected with the user terminal and the corresponding coding and modulation scheme.

In an embodiment, the present invention provides a wireless access node, which includes:

a first sending module, configured to send pilot signal strength or channel characteristics to a central processing node, where the pilot signal strength or channel characteristics are fed back by a user terminal within the coverage area of the wireless access node and are between the wireless access node and the corresponding user terminal;

a first receiving module, configured to receive access indication information of the user terminal, which is fed back by the central processing node and determined according to the pilot signal strength or channel characteristics, where the access indication information of the user terminal includes an identifier of the wireless access node connected with the user terminal and a corresponding coding and modulation scheme; and a second sending module, configured to send the identifier of the wireless access node connected with the user terminal and the corresponding coding and modulation scheme to the corresponding user terminal.

In an embodiment, the present invention provides a central processing node, which includes:

a receiving module, configured to receive pilot signal strength or channel characteristics sent by a wireless access node, where the pilot signal strength or channel characteristics are fed back by a user terminal within a coverage area or detected by the wireless access node, and are between the wireless access node and the corresponding user terminal;

a determining module, configured to determine access indication information of the user terminal according to the pilot signal strength or channel characteristics, where the access indication information of the user terminal includes an identifier of the wireless access node connected with the user terminal and a corresponding coding and modulation scheme; and a sending module, configured to send the identifier of the wireless access node connected with the user terminal and the corresponding coding and modulation scheme to the corresponding user terminal through the wireless access node.

In an embodiment, the present invention provides a user terminal, which includes:

an access indication information module, configured to receive access indication information, which is returned by a wireless access node and is determined by a central processing node according to pilot signal strength or channel characteristics between the home wireless access node and the corresponding user terminal, where the access indication information includes an identifier of the wireless access node connected with the user terminal and a corresponding coding and modulation scheme; and a data transceiving module, configured to send or receive service data to or from the wireless access node corresponding to the identifier of the wireless access node according to the identifier of the wireless access node connected with the user terminal and the corresponding coding and modulation scheme.

In an embodiment, the present invention provides a wireless access system, which includes:

the preceding wireless access node, central processing node, and user terminal.

With the wireless access method, device, and system provided by the present invention, in a grid wireless access system, the central processing node may determine access indication information of a user terminal according to pilot signal strength or channel characteristics and thus allocate appropriate wireless access nodes and corresponding modulation and coding schemes to different user terminals, which may reduce the interference between neighboring wireless access nodes or neighboring user terminals, give full play to advantages of the grid wireless access system, such as a micro cell of a small radius, and provide higher system bandwidth.

BRIEF DESCRIPTION OF THE DRAWINGS

To illustrate the technical solutions according to embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

In order to make the objectives, technical solutions, and advantages of the present invention more comprehensible, the technical solutions according to the embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
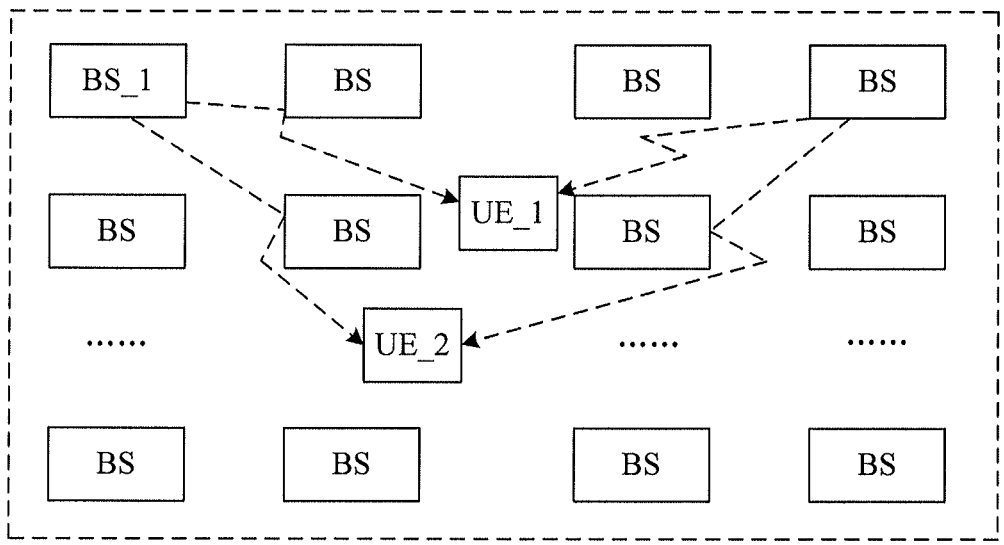
FIG. 1 is a schematic diagram of a conventional grid wireless access system.
Figure 2:
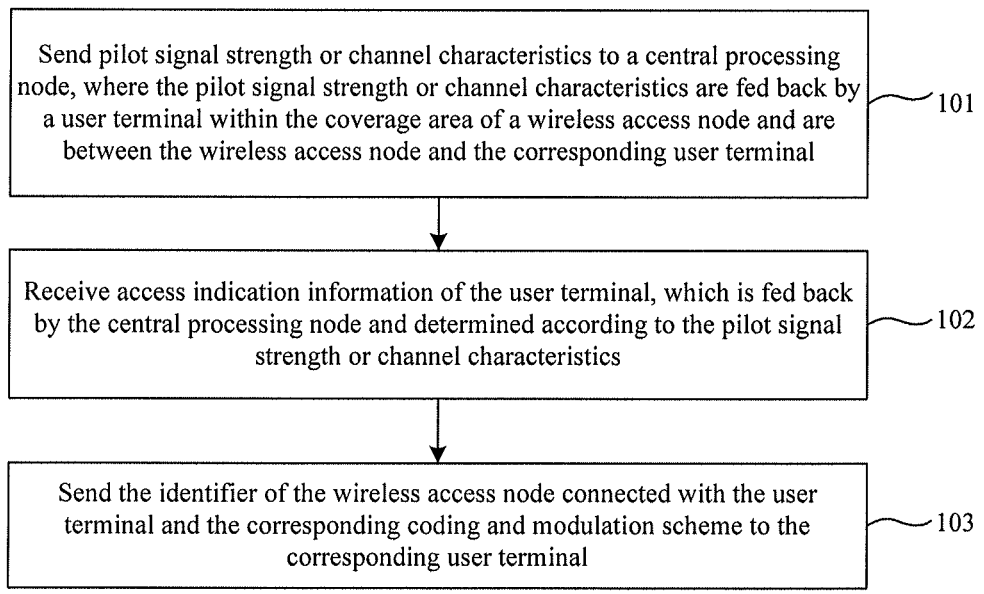
FIG. 2 is a flowchart of a first embodiment of a wireless access method according to the present invention.

FIG. 2 is a flowchart of a first embodiment of a wireless access method according to the present invention. As shown in FIG. 2, in a grid wireless access system where wireless access nodes in micro cells of a small radius are close to each other, the wireless access method includes:

Step 101: Send pilot signal strength or channel characteristics to a central processing node, where the pilot signal strength or channel characteristics are fed back by a user terminal within the coverage area of a wireless access node and are between the wireless access node and the corresponding user terminal.

Before step 101, if the wireless access node sends a downlink signal to the user terminal, the method may further include: sending a pilot signal to the user terminal that is within the coverage area by broadcast; and receiving the pilot signal strength or channel characteristics, which are returned by the user terminal and are between the wireless access node and the corresponding user terminal.

Before step 101, if the user terminal sends an uplink signal to the wireless access node, the method may further include: receiving a pilot signal sent by the user terminal that is within the coverage area by broadcast; and detecting the pilot signal strength or channel characteristics between the wireless access node and the corresponding user terminal.

Step 102: Receive access indication information of the user terminal, which is fed back by the central processing node and is determined according to the pilot signal strength or channel characteristics, where the access indication information of the user terminal includes an identifier of the wireless access node connected with the user terminal and a corresponding coding and modulation scheme.

Step 103: Send the identifier of the wireless access node connected with the user terminal and the corresponding coding and modulation scheme to the corresponding user terminal.

After step 103, in case of downlink transmission, the method may further include: sending service data to the corresponding user terminal according to the identifier of the wireless access node connected with the user terminal and the corresponding coding and modulation scheme; in case of uplink transmission, the method may further include: receiving, according to the identifier of the wireless access node connected with the user terminal and the corresponding coding and modulation scheme, service data sent by the user terminal.

In case of downlink transmission, after a wireless access node, for example, a base station, an antenna, a relay station, a repeater, or different virtual base stations formed by the same base station through the beams of a smart antenna, sends a pilot signal to a user terminal that is within the coverage area by broadcast, if the wireless access node receives the pilot signal strength or channel characteristics, which are returned by the user terminal and are between the wireless access node and the corresponding user terminal, the wireless access node may send the pilot signal strength or channel characteristics between the wireless access node and the corresponding user terminal to the central processing node. The pilot signal strength or channel characteristics returned by each user terminal to the home wireless access node may be pilot signal strength or channel characteristics between the wireless access node and the corresponding user terminal, or may be pilot signal strength or channel characteristics between all the home wireless access nodes of the user terminal and the corresponding user terminal. The central processing node may determine the access indication information of the user terminal according to each of the pilot signal strength or channel characteristics, and send the access indication information to the wireless access node, and the wireless access node may send the identifier of the wireless access node connected with the user terminal and the corresponding coding and modulation scheme to the corresponding user terminal. The access indication information of the user terminal includes: an identifier of the wireless access node connected with the user terminal and a corresponding coding and modulation scheme, where the identifier of the wireless access node may be a base station identifier, an antenna identifier, a relay station identifier, a repeater identifier, or identifiers of different virtual base stations formed by the same base station through the beams of a smart antenna. Then, the wireless access node sends service data to the corresponding user terminal according to the identifier of the wireless access node connected with the user terminal and the corresponding coding and modulation scheme.

In case of uplink transmission, after the wireless access node receives the pilot signal sent by broadcast by the user terminal that is within the coverage area, the wireless access node may detect the pilot signal strength or channel characteristics between the wireless access node and the user terminal according to the pilot signal of the user terminal, and then send the pilot signal strength or channel characteristics to the central processing node. The central processing node may determine the access indication information of the user terminal according to the pilot signal strength or channel characteristics, and send the access indication information to the wireless access node, and the wireless access node may send the identifier of the wireless access node connected with the user terminal and the corresponding coding and modulation scheme to the corresponding user terminal. Then, the wireless access node receives, according to the identifier of the wireless access node connected with the user terminal and the corresponding coding and modulation scheme, the service data sent by the user terminal.

In a grid wireless access system of the embodiment, after the wireless access node sends the pilot signal strength or channel characteristics to the central processing node, which are fed back within the coverage area of the wireless access node and are between the wireless access node and the corresponding user terminal, the central processing node may allocate appropriate wireless access nodes and corresponding modulation and coding schemes to different user terminals according to the pilot signal strength or channel characteristics, which may reduce the interference between neighboring wireless access nodes or neighboring user terminals, give full play to advantages of the grid wireless access system, such as a micro cell of a small radius, and provide higher system bandwidth.

Figure 3:
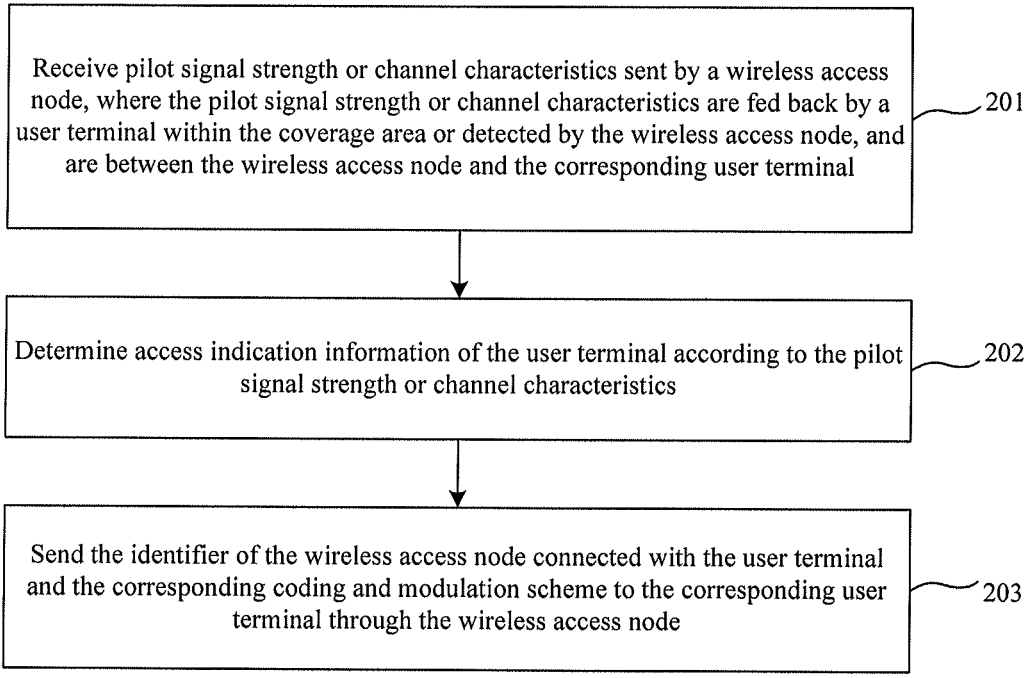
FIG. 3 is a flowchart of a second embodiment of a wireless access method according to the present invention.

FIG. 3 is a flowchart of a second embodiment of a wireless access method according to the present invention. As shown in FIG. 3, in a grid wireless access system where wireless access nodes in micro cells of a small radius are close to each other, the wireless access method includes:

Step 201: Receive pilot signal strength or channel characteristics sent by a wireless access node, where the pilot signal strength or channel characteristics are fed back by a user terminal within a coverage area or are detected by the wireless access node, and are between the wireless access node and the corresponding user terminal.

In case of downlink transmission, the central processing node may receive the pilot signal strength or channel characteristics sent by the wireless access node, where the pilot signal strength or channel characteristics are fed back by the user terminal within the coverage area and are between the wireless access node and the corresponding user terminal; in case of uplink transmission, the central processing node may receive the pilot signal strength or channel characteristics that are sent by the wireless access node and detected according to the pilot signal of the user terminal.

Step 202: Determine access indication information of the user terminal according to the pilot signal strength or channel characteristics, where the access indication information of the user terminal includes an identifier of the wireless access node connected with the user terminal and a corresponding coding and modulation scheme.

In case of downlink transmission, step 202 may be specifically: determining, according to the pilot signal strength or channel characteristics, interference strength of the signal sent by the wireless access node to the user terminal; and calculating a sum of interference strength to other user terminals than a target user terminal when each candidate wireless access node sends a signal to the target user terminal, selecting a candidate access node corresponding to the smallest value of the sum of the interference strength as a target wireless access node which provides a downlink service for the target user terminal, and determining the identifier of the target wireless access node and the corresponding coding and modulation scheme.

In case of uplink transmission, step 202 may be specifically: determining, according to the channel characteristics, the interference strength of a signal received by the wireless access node from the user terminal; and when a target user terminal sends a signal to each candidate wireless access node, calculating a sum of interference strength to other wireless access nodes than the candidate wireless access node, selecting a candidate wireless access node corresponding to the smallest value of the sum of the interference strength as a target wireless access node which provides an uplink service for the target user terminal, and determining the identifier of the target wireless access node and the corresponding coding and modulation scheme.

Step 203: Send the identifier of the wireless access node connected with the user terminal and the corresponding coding and modulation scheme to the corresponding user terminal through the wireless access node.

In the grid wireless access system of the embodiment, the central processing node may allocate appropriate wireless access nodes and corresponding modulation and coding schemes to different user terminals according to the pilot signal strength or channel characteristics, which may reduce the interference between neighboring wireless access nodes or neighboring user terminals, give full play to advantages of the grid wireless access system, such as a micro cell of a small radius, and provide higher system bandwidth.

Figure 4:
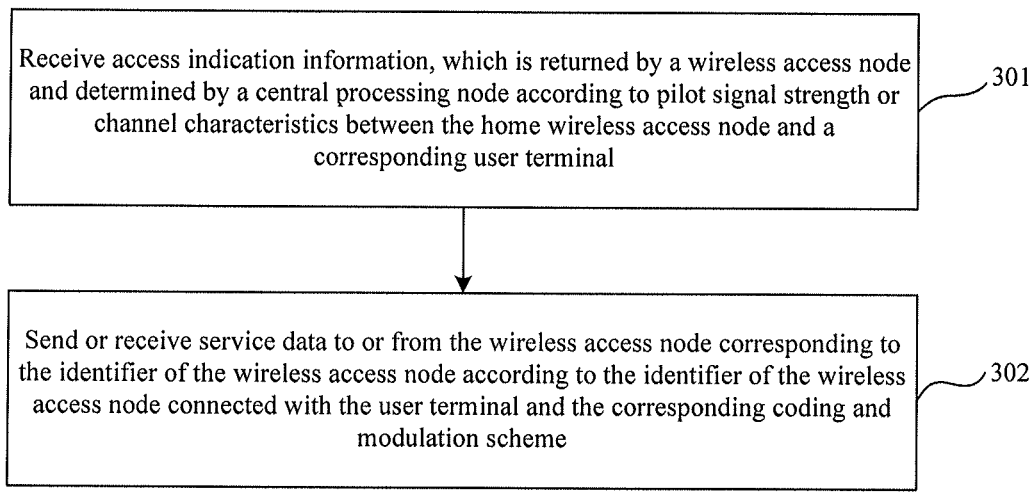
FIG. 4 is a flowchart of a third embodiment of a wireless access method according to the present invention.

FIG. 4 is a flowchart of a third embodiment of a wireless access method according to the present invention. As shown in FIG. 4, in a grid wireless access system where wireless access nodes in micro cells of a small radius are close to each other, the wireless access method includes:

Step 301: Receive access indication information, which is returned by a wireless access node and is determined by a central processing node according to pilot signal strength or channel characteristics between the home wireless access node and a corresponding user terminal, where the access indication information includes an identifier of the wireless access node connected with the user terminal and a corresponding coding and modulation scheme.

Before step 301, in case of uplink transmission, the user terminal may further execute the following step: receiving a pilot signal sent by broadcast by the home wireless access node, and returning the pilot signal strength or channel characteristics between the wireless access node and the corresponding user terminal.

Before step 301, in case of downlink transmission, the user terminal may further execute the following step: sending a pilot signal to the home wireless access node by broadcast, so that the wireless access node detects the pilot signal strength or channel characteristics between the wireless access node and the corresponding user terminal according to the pilot signal.

Step 302: Send or receive service data to or from the wireless access node corresponding to the identifier of the wireless access node according to the identifier of the wireless access node connected with the user terminal and the corresponding coding and modulation scheme.

In case of downlink transmission, after the user terminal receives the pilot signal sent by broadcast by the home wireless access node, for example, a base station, an antenna, a relay station, a repeater, or different virtual base stations formed by the same base station through the beams of a smart antenna, the user terminal may return the pilot signal strength or channel characteristics between the wireless access node and the corresponding user terminal. The pilot signal strength or channel characteristics returned by each user terminal to the home wireless access node may be pilot signal strength or channel characteristics between the wireless access node and the corresponding user terminal; or may be pilot signal strength or channel characteristics, where the pilot signal strength or channel characteristics are received by the user terminal and are between all wireless access nodes and the corresponding user terminal. Then, the wireless access node in a network may send the received pilot signal strength or channel characteristics to the central processing node, and the central processing node determines the corresponding access indication information according to the pilot signal strength or channel characteristics corresponding to each user terminal. The access indication information of the user terminal includes: an identifier of the wireless access node which the user terminal accesses and a corresponding coding and modulation scheme, where the identifier of the wireless access node may be a base station identifier, an antenna identifier, a relay station identifier, a repeater identifier, or identifiers of different virtual base stations formed by the same base station through the beams of a smart antenna. After the user terminal receives the access indication information through the wireless access node, the user terminal may send or receive service data to or from the wireless access node corresponding to the identifier of the wireless access node according to the identifier of the wireless access node and the corresponding coding and modulation scheme.

In case of uplink transmission, after the user terminal sends the pilot signal by broadcast, the wireless access node may detect the pilot signal strength or channel characteristics between the wireless access node and the corresponding user terminal according to the pilot signal of the user terminal. Then, the wireless access node sends the pilot signal strength or channel characteristics between the wireless access node and the corresponding user terminal to the central processing node, and the central processing node determines the corresponding access indication information according to the pilot signal strength or channel characteristics between each wireless access node and the corresponding user terminal. After the user terminal receives the access indication information through the wireless access node, the user terminal may send or receive service data to or from the wireless access node corresponding to the identifier of the wireless access node according to the identifier of the wireless access node and the corresponding coding and modulation scheme.

In the grid wireless access system where the wireless access nodes in micro cells of a small radius are close to each other in the embodiment, the central processing node may allocate appropriate wireless access nodes and corresponding modulation and coding schemes to different user terminals according to the pilot signal strength or channel characteristics, which may reduce the interference between neighboring wireless access nodes or neighboring user terminals, give full play to advantages of the micro cells of a small radius, and provide higher system bandwidth.

Figure 5:
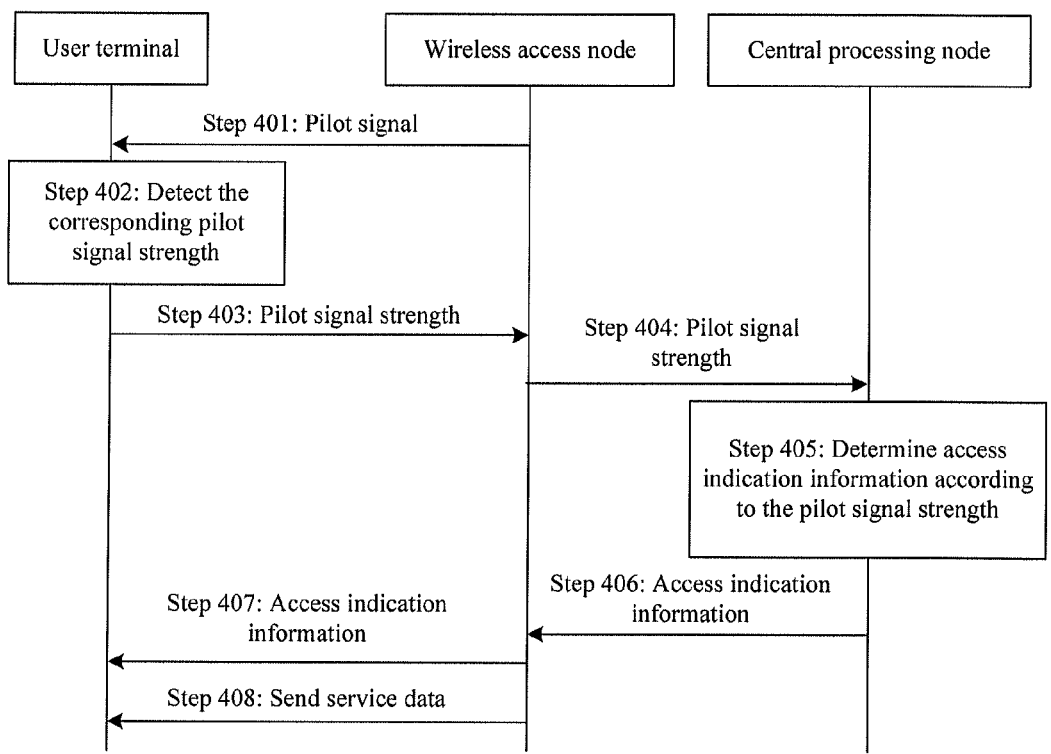
FIG. 5 is a signaling flowchart of a fourth embodiment of a wireless access method according to the present invention.

FIG. 5 is a signaling flowchart of a fourth embodiment of a wireless access method according to the present invention. As shown in FIG. 5, in a grid wireless access system where wireless access nodes in micro cells of a small radius are close to each other, it is assumed that K user terminals UEs are in the coverage area of L wireless access nodes. Herein the wireless access nodes include a BS, an antenna, a relay (Relay) station, a repeater, and a virtual node formed by the same BS through different beams. K UEs are scheduled to the same channel to receive and send data, and co-channel interference exists between the UEs. In case of downlink transmission, the processing procedure of the wireless access method adopted by the system is as follows:

Step 401: Different wireless access nodes send pilot signals by broadcast, for example, in M timeslots $\{t_0, t_1, \ldots, t_{M-1}\}$, different wireless access nodes send pilot signals, respectively.

Step 402: After each user terminal UE receives pilot signals from different wireless access nodes, the UE detects the pilot signal strength corresponding to the received pilot signals of the wireless access nodes, where the pilot signal strength may be represented by a signal to interference plus noise ratio SINR.

Step 403: Each UE feeds back information, such as the detected pilot signal strength between different wireless access nodes and the UE, to a network. The feedback manner may be as follows: Each UE feeds back the information, such as the corresponding pilot signal strength, to its respective home wireless access nodes, or each UE sends the information, such as the corresponding pilot signal strength, to all wireless access nodes in the network by broadcast, and each node combines the information.

Step 404: The wireless access node notifies the information, such as the pilot signal strength fed back by the UE, to a central processing node through a background network, where the central processing node may be a fixed device, for example, a radio network controller (Radio Network Controller, RNC), or may be a specified wireless access node.

Step 405: The central processing node may determine access indication information, such as the identifier of the wireless access node (or which wireless access node provides a downlink service) which each UE accesses and the corresponding coding and modulation scheme, and a beamforming scheme, according to the information, such as pilot signal strength fed back by each UE and received from each wireless access node.

For example, if an $l_0^{th}$ wireless access node is selected as a wireless access node which a $k_0^{th}$ UE accesses, the selection of the $l_0^{th}$ wireless access node satisfies the following formula (1).

$$\min_{l_0 \in (1, \ldots L)} \sum_{k=1, k \neq k_0}^{K} \gamma_{kl_0} \qquad (1)$$

$\gamma_{kl_0}$ indicates pilot signal strength, which is detected by a $k^{th}$ UE in the network and is between the $l_0^{th}$ wireless access node and the UE. The meaning of formula (1) is: in all candidate wireless access nodes related to the $k_0^{th}$ UE, calculating a sum of interference strength to other K−1 UEs than the $k_0^{th}$ UE when each candidate wireless access node sends a signal to the $k_0^{th}$ UE, and selecting the $l_0^{th}$ wireless access node to provide a downlink service for the $k_0^{th}$ UE when the sum of the interference strength corresponding to the $l_0^{th}$ wireless access node is the smallest.

Step 406: The central processing node notifies the access indication information, such as the identifier of the wireless access node which each UE accesses and the corresponding modulation and coding information, and the beamforming scheme, to the corresponding wireless access node.

Step 407: The wireless access node notifies the access indication information, such as the identifier of the wireless access node which each UE accesses and the corresponding modulation and coding information, and the beamforming scheme, to each UE.

Step 408: The wireless access node uses the corresponding modulation and coding scheme, the beamforming scheme, and so on to send service data according to the access indication information obtained in step 406.

In the grid wireless access system of the embodiment, the central processing node may allocate appropriate wireless access nodes and corresponding modulation and coding schemes to different user terminals according to the pilot signal strength or channel characteristics, which may reduce the interference between neighboring wireless access nodes or neighboring user terminals, give full play to advantages of the grid wireless access system such as micro cells of a small radius where the wireless access nodes are close to each other, and provide higher system bandwidth for users.

Figure 6:
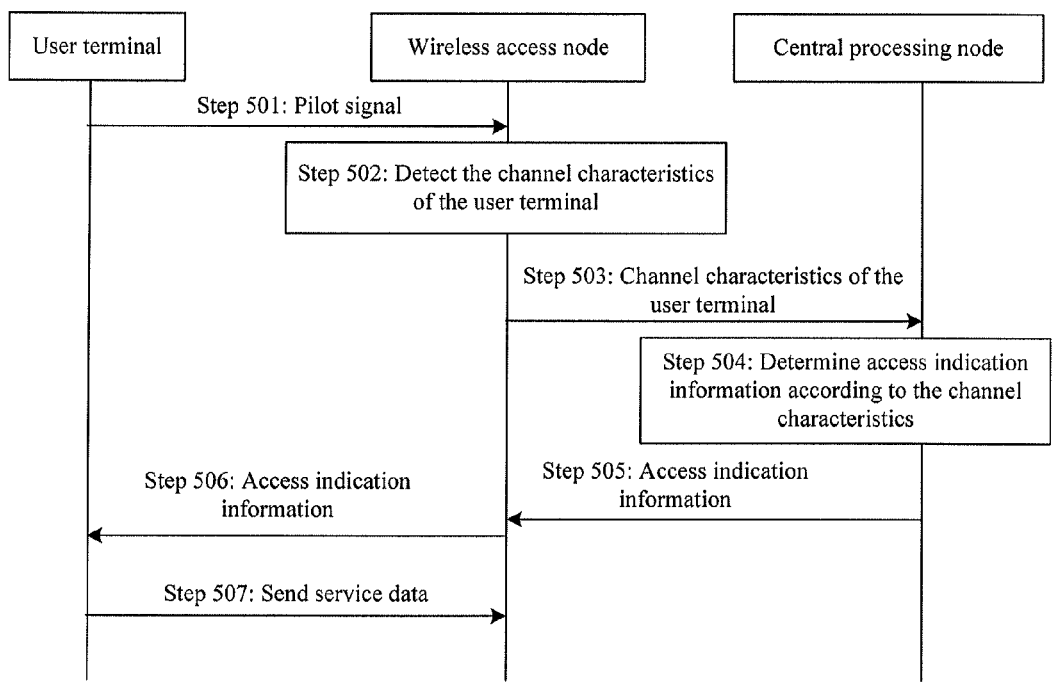
FIG. 6 is a signaling flowchart of a fifth embodiment of a wireless access method according to the present invention.

FIG. 6 is a signaling flowchart of a fifth embodiment of a wireless access method according to the present invention. As shown in FIG. 6, in a grid wireless access system where wireless access nodes in micro cells of a small radius are close to each other, it is assumed that K user terminals UEs are in the coverage area of L wireless access nodes. Herein the wireless access nodes include a BS, an antenna, a relay (Relay) station, a repeater, and a virtual node formed by the same BS through different beams. K UEs are scheduled to the same channel to receive and send data, and co-channel interference exists between the UEs. In case of uplink transmission, the processing procedure of the wireless access method adopted by the system is as follows:

Step 501: Each user terminal UE sends a pilot signal by broadcast, for example, in K timeslots $\{t_0, t_1, \ldots, t_{K-1}\}$, different UEs send pilot signals, respectively.

Step 502: Each wireless access node detects the channel characteristics of each UE according to the received pilot signals of different UEs.

Step 503: Each wireless access node feeds back the detected channel characteristics of each UE to a central processing node, where the central processing node may be a fixed device, such as an RNC, or may be a specified wireless access node.

Step 504: The central processing node determines access indication information, such as an identifier of the wireless access node which each UE accesses and the corresponding coding and modulation scheme, and a beamforming scheme, according to the received channel characteristics of the UE.

For example, if an $l_0{}^{th}$ wireless access node is selected as the wireless access node for a $k_0{}^{th}$ UE, the channel characteristics of the $k_0{}^{th}$ UE satisfy the following formula (2):

$$\min_{l_0 \in (1,\ldots L)} \sum_{l=1, l\neq l_0}^{L} \gamma_{lk_0} = \min_{l_0 \in (1,\ldots L)} \sum_{l=1, l\neq l_0}^{L} \|H_{lk_0}\|^2 \quad (2)$$

$\|H_{lk_0}\|^2$ is the channel characteristic of the $k_0{}^{th}$ UE detected by an $l^{th}$ wireless access node; $r_{lk_0} = \|H_{lk_0}\|^2$ the pilot signal strength received by the $l^{th}$ wireless access node from the $k_0{}^{th}$ UE. The meaning of formula (2) is: in all candidate wireless access nodes related to the $k_0{}^{th}$ UE, calculating a sum of interference strength to other L−1 wireless access nodes than the candidate wireless access node when the $k_0{}^{th}$ UE that accesses the wireless access node sends a signal, and when the sum of the interference strength corresponding to the $l_0{}^{th}$ candidate wireless access node is the smallest, selecting the $l_0{}^{th}$ wireless access node which the $k_0{}^{th}$ UE accesses.

Step 505: The central processing node notifies access indication information, such as the identifier of the wireless access node which each UE accesses and the corresponding modulation and coding information, and the beamforming scheme, to the corresponding wireless access node.

Step 506: The wireless access node notifies the access indication information, such as the identifier of the wireless access node which each UE accesses and the corresponding modulation and coding information, and the beamforming scheme, to each UE.

Step 507: Each UE uses the corresponding modulation and coding scheme, the beamforming scheme, and so on to send service data according to the access indication information obtained in step 506.

In the grid wireless access system where the wireless access nodes in micro cells of a small radius are close to each other in the embodiment, the central processing node may allocate appropriate wireless access nodes and corresponding modulation and coding schemes to different user terminals according to the pilot signal strength or channel characteristics, which may reduce the interference between neighboring wireless access nodes or neighboring user terminals, give full play to advantages of the micro cells of a small radius, and provide higher system bandwidth.

Figure 7A:
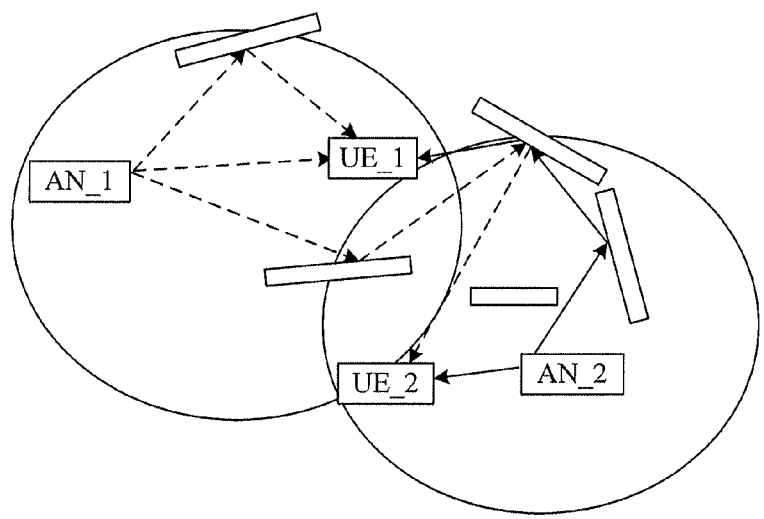
FIG. 7a is a schematic diagram illustrating an application scenario of an embodiment of a wireless access method according to the present invention.

FIG. 7a is a schematic diagram illustrating an application scenario of an embodiment of a wireless access method according to the present invention. As shown in FIG. 7a, it is assumed that a wireless access node uses one antenna to perform transmission or that after signal processing, there is only one logical antenna for transmission. In case of downlink transmission, an example that a wireless access system includes two wireless access nodes and two user terminals UEs is taken. In the system, wireless access nodes AN_1 and AN_2 provide downlink services for UE_1 and UE_2, and the two user terminals are scheduled to the same wireless channel and great interference exists between the two user terminals. Because the locations of the two user terminals are different, the space paths that the pilot signals from different wireless access nodes pass through are also different:

For the UE_1, the pilot signal sent by the AN_1 to the UE_1 passes through a direct path, and the pilot signal sent by the AN_2 to the UE_1 needs to be reflected many times. Therefore, the signal to interference plus noise ratio of the pilot signal received by the UE_1 from the AN_1 is high, while the signal to interference plus noise ratio of the pilot signal received by the UE_1 from the AN_2 is low, or even the UE_1 cannot receive the pilot signal from the AN_2. In addition, according to the signal to interference plus noise ratios of the pilot signals of the AN_1 and AN_2 returned by the UE_1, the central processing node may determine by calculation based on the above formula (1) that the interference on the UE_2 is small when the AN_1 sends service data to the UE_1.

For the UE_2, the pilot signal sent by the AN_2 to the UE_2 passes through a direct path, and the pilot signal sent by the AN_1 to the UE_2 needs to be reflected many times. Therefore, the signal to interference plus noise ratio of the pilot signal received by the UE_2 from the AN_2 is high, while the signal to interference plus noise ratio of the pilot signal received by the UE_2 from the AN_1 is low, or even the UE_2 cannot receive the pilot signal from the AN_1. In addition, according to the signal to interference plus noise ratios of the pilot signals of the AN_1 and AN_2 returned by the UE_2, the central processing node may determine by calculation based on the above formula (1) that the interference on the UE_1 is small when the AN_2 sends service data to the UE_2.

Therefore, when scheduling and allocating resources to the UE, the wireless access node may perform dynamic path selection, select the path passing through the AN_1 to send the pilot signal to the UE 1, and select the path passing through the AN_2 to send the pilot signal to the UE 2. In this case, the pilot signals sent by a network side to the UE1 and UE2 may pass through different paths to reach their respective users. Because appropriate space paths are selected, mutual interference may be ignored, and the capacity of the wireless access system may be increased.

Figure 7B:
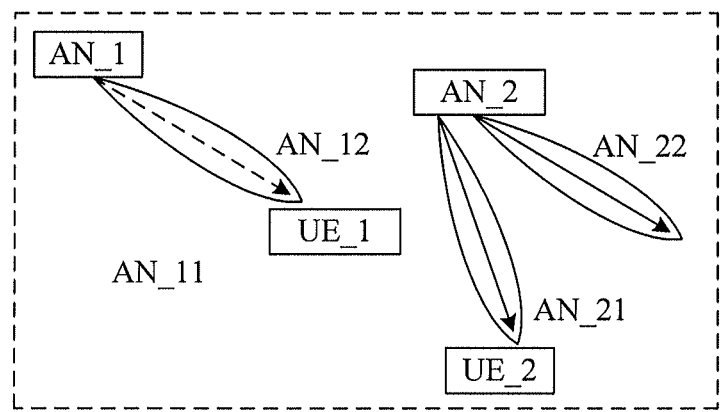
FIG. 7b is a schematic diagram illustrating another application scenario of an embodiment of a wireless access method according to the present invention.

FIG. 7b is a schematic diagram illustrating another application scenario of an embodiment of a wireless access method according to the present invention. As shown in FIG. 7b, when multi-antenna transmission exists at a wireless access node, a dynamic beamforming technology is used at a transmitting end, which can better cancel the interference from a neighboring wireless access node. A conventional beamforming technology is as follows: For a user terminal in a current cell, the wireless access node selects signals transmitted by appropriate beams, to form different transmit beams; the wireless access node selects an appropriate group of UEs from a current cell center, and uses an appropriate beamforming scheme for sent signals, so that different beams point to different UEs, which can increase the signal to interference plus noise ratios of received signals and reduce the mutual interference between different signals sent to two UEs. In the embodiment of the present invention, the beamforming scheme is determined not only according to user terminals within the current cell of each wireless access node but also according to other user terminals within the coverage area of the wireless access node in a network.

In FIG. 7b, the wireless access nodes AN_1 and AN_2 also provide downlink services for the UE_1 and UE_2, but the phenomenon of different multiple paths from a wireless access node to a UE in the application scenario of FIG. 7a does not exist in FIG. 7b; the path from the UE_1 to the AN_1 and the path from the UE_2 to the AN_2 are direct paths. In this case, beamforming of the transmitting end may be used to cancel interference. As shown in FIG. 7b, in the AN_1, two downlink transmit beams may be obtained through beamforming, it is assumed that virtual wireless access nodes corresponding to different downlink transmit beams are the AN_11 and AN_12. Likewise, in the AN_2, virtual wireless access nodes AN_21 and AN_22 corresponding to two downlink transmit beams may be obtained through beamforming. Then, the central processing node uses the formula (1) in the above embodiment according to the signal to interference plus noise ratios of the pilot signals of the AN_11 and AN_12 returned by the UE_1 and the signal to interference plus noise ratios of the pilot signals of the AN_21 and AN_22 returned by the UE_2, to perform calculation and determine that: when the AN_12 is selected to transmit data to the UE_1, the interference caused to the UE_2 is the smallest, and quality of the signal received by the UE_1 is the highest; when the AN_21 is selected to transmit data to the UE_2, the interference caused to the UE_1 is the smallest, and quality of the signal received by the UE_1 is the highest. By using the beamforming scheme, interference between the signals sent by the wireless access node to different UEs may be ignored, thereby greatly increasing the system capacity.

Figure 7C:
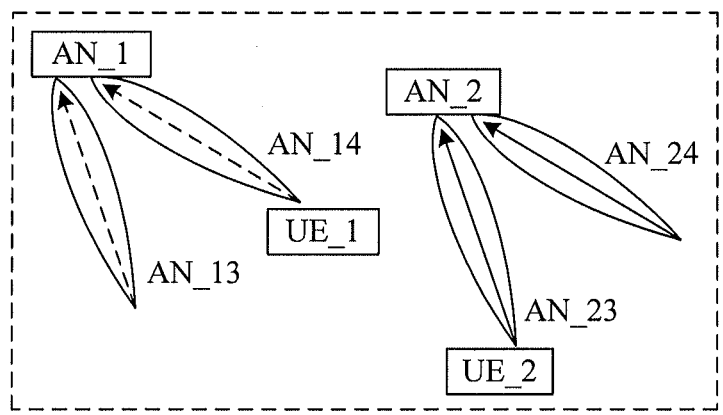
FIG. 7c is a schematic diagram illustrating still another application scenario of an embodiment of a wireless access method according to the present invention.

FIG. 7c is a schematic diagram illustrating another application scenario of an embodiment of a wireless access method according to the present invention. As shown in FIG. 7c, when multi-antenna transmission exists at a wireless access node, for uplink transmission, if a dynamic beamforming technology can be used at a receiving end, namely, the wireless access node, the interference from different UEs can be cancelled better. For the specific embodiment, reference can be made to FIG. 7c. Corresponding to FIG. 7b, in FIG. 7c, the wireless access nodes AN_1 and AN_2 provide uplink services for the UE_1 and UE_2, but the phenomenon of different multiple paths from a wireless access node to a UE in the application scenario of FIG. 7a does not exist in FIG. 7c; the path from the UE_1 to the AN_1 and the path from the UE_2 to the AN_2 are direct paths. In this case, beamforming of the receiving end may be used to cancel interference.

As shown in FIG. 7c, in the AN_1, two uplink transmit beams may be obtained through beamforming, it is assumed that virtual wireless access nodes corresponding to different uplink transmit beams are the AN_13 and AN_14. Likewise, in the AN_2, virtual wireless access nodes AN_23 and AN_24 corresponding to two uplink transmit beams may be obtained through beamforming. Then, a central processing node uses the formula (2) in the above embodiment according to the channel characteristics of the UE returned by the AN_13 and AN_14 and the channel characteristics of the UE_2 returned by the AN_23 and AN_24, to perform calculation and determine that: when the AN_14 is selected to receive data from the UE_1, the signal to interference plus noise ratio of the pilot signal sent by the UE_1 is highest since it is located in the main lobe of the beam of the AN_1, while the signal to interference plus noise ratio is lower when it is located in the side lobe or even in the zero gain direction of the beam of the AN_2, and therefore, the interference caused by the pilot signal received by the AN_14 from the UE_1 to the pilot signal received by the AN_2 from the UE_2 is the smallest; when the AN_23 is selected to receive data from the UE_2, the signal to interference plus noise ratio of the pilot signal sent by the UE_2 is highest since it is located in the main lobe of the beam of the AN_2; while the signal to interference plus noise ratio is lower when it is located in the side lobe or even in the zero gain direction of the beam of the AN_1, and the interference to the signal of the UE_1 received by the AN_1 is the smallest. By using the beamforming scheme, interference between the pilot signals sent by different UEs may be ignored, thereby greatly increasing the system capacity.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, or an optical disk.

Figure 8:
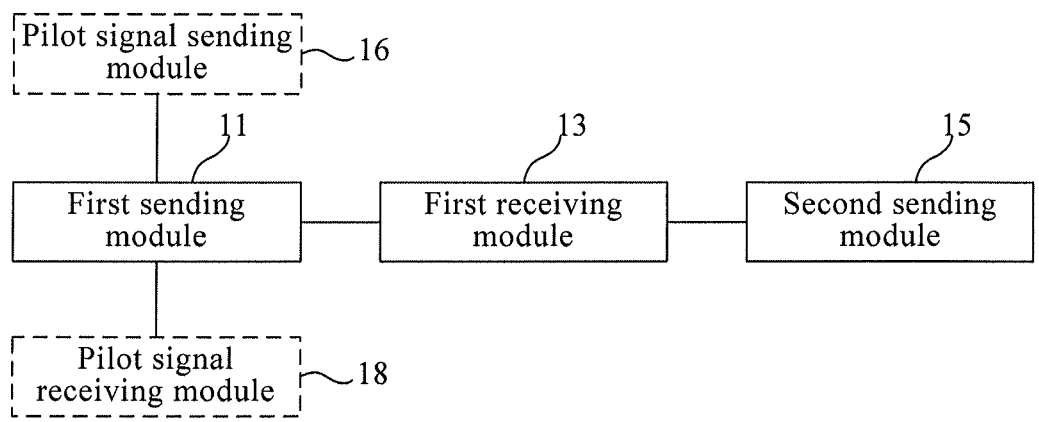
FIG. 8 is a schematic structural diagram of an embodiment of a wireless access node according to the present invention.

FIG. 8 is a schematic structural diagram of an embodiment of a wireless access node according to the present invention. As shown in FIG. 8, the wireless access node may include:

a first sending module 11, configured to send pilot signal strength or channel characteristics to a central processing node, where the pilot signal strength or channel characteristics are fed back by a user terminal within the coverage area of the wireless access node and are between the wireless access node and the corresponding user terminal;

a first receiving module 13, configured to receive access indication information of the user terminal, which is fed back by the central processing node and determined according to the pilot signal strength or channel characteristics, where the access indication information of the user terminal includes an identifier of the wireless access node connected with the user terminal and a corresponding coding and modulation scheme; and a second sending module 15, configured to send the identifier of the wireless access node connected with the user terminal and the corresponding coding and modulation scheme to the corresponding user terminal.

Further, if the wireless access node performs downlink transmission, the wireless access node may further include:

a pilot signal sending module 16, configured to send a pilot signal to the user terminal within the coverage area by broadcast; and receive the pilot signal strength or channel characteristics, where the pilot signal strength or channel characteristics are returned by the user terminal and are between the wireless access node and the corresponding user terminal;

or, if the wireless access node performs downlink transmission, the wireless access node may further include:

a pilot signal receiving module 18, configured to receive the pilot signal sent by broadcast by the user terminal within the coverage area; and according to the pilot signal of the user terminal, detect the pilot signal strength or channel characteristics between the wireless access node and the corresponding user terminal.

Specifically, in a grid wireless access system where wireless access nodes in micro cells of a small radius are close to each other, in case of downlink transmission, after the pilot signal sending module 16 of a wireless access node, for example, a base station, an antenna, a relay station, a repeater, or different virtual base stations formed by the same base station through the beams of a smart antenna, sends a pilot signal to a user terminal that is within the coverage area by broadcast, if the pilot signal strength or channel characteristics, which are returned by the user terminal and are between the wireless access node and the corresponding user terminal, are received, the first sending module 11 may send the pilot signal strength or channel characteristics between the wireless access node and the corresponding user terminal to the central processing node. The pilot signal strength or channel characteristics returned by each user terminal to the home wireless access node may be pilot signal strength between the wireless access node and the corresponding user terminal, or may be pilot signal strength or channel characteristics between all home wireless access nodes of the user terminal and the corresponding user terminal. The central processing node may determine the access indication information of the user terminal according to each of the pilot signal strength or channel characteristics, and send the access indication information to the wireless access node; after the first receiving module 13 receives the access indication information, the second sending module 15 may send the identifier of the wireless access node connected with the user terminal and the corresponding coding and modulation scheme to the corresponding user terminal. The access indication information of the user terminal includes: the identifier of the wireless access node connected with the user terminal and the corresponding coding and modulation scheme, where the identifier of the wireless access node may be a base station identifier, an antenna identifier, a relay station identifier, a repeater identifier, or identifiers of different virtual base stations formed by the same base station through the beams of a smart antenna. Then, the wireless access node sends service data to the corresponding user terminal according to the identifier of the wireless access node connected with the user terminal and the corresponding coding and modulation scheme.

In case of uplink transmission, after the pilot signal receiving module 18 of the wireless access node receives the pilot signal that is sent by the user terminal within the coverage area by broadcast, the pilot signal receiving module 18 may detect the pilot signal strength or channel characteristics between the wireless access node and the corresponding user terminal according to the pilot signal of the user terminal, and then the first sending module 11 sends the pilot signal strength or channel characteristics between the wireless access node and the corresponding user terminal to the central processing node. The central processing node may determine the access indication information of the user terminal according to the pilot signal strength or channel characteristics between the wireless access node and the corresponding user terminal, and send the access indication information to the wireless access node; after the first receiving module 13 receives the access indication information, the second sending module 15 may send the identifier of the wireless access node connected with the user terminal and the corresponding coding and modulation scheme to the corresponding user terminal. Then, the wireless access node receives, according to the identifier of the wireless access node connected with the user terminal and the corresponding coding and modulation scheme, the service data sent by the user terminal.

In the grid wireless access system where the wireless access nodes in micro cells of a small radius are close to each other in the embodiment, after the first sending module sends the pilot signal strength or the channel characteristics between the wireless access node and the corresponding user terminals which are located in the coverage area of the wireless access node to the central processing node, the central processing node may allocate appropriate wireless access nodes and corresponding modulation and coding schemes to different user terminals according to the pilot signal strength or channel characteristics, which may reduce the interference between neighboring wireless access nodes or neighboring user terminals, give full play to advantages of the micro cells of a small radius, and provide higher system bandwidth.

Figure 9:
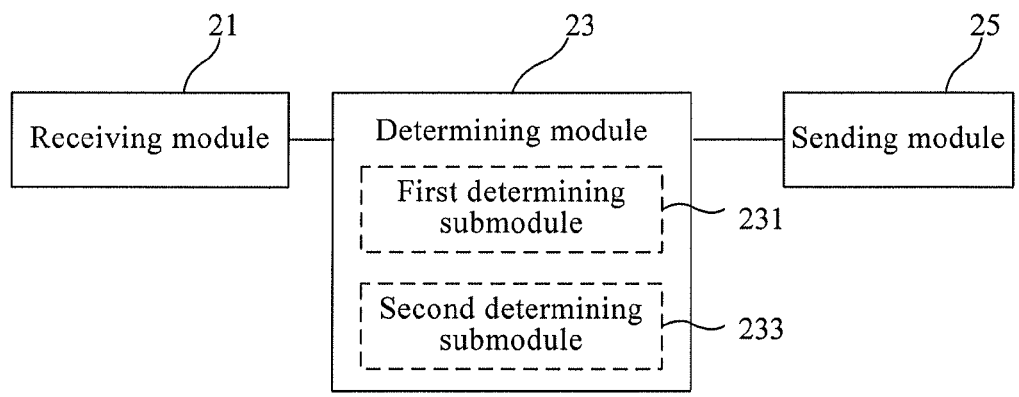
FIG. 9 is a schematic structural diagram of an embodiment of a central processing node according to the present invention.

FIG. 9 is a schematic structural diagram of an embodiment of a central processing node according to the present invention. As shown in FIG. 9, the central processing node may include:

a receiving module 21, configured to receive pilot signal strength or channel characteristics sent by a wireless access node, where the pilot signal strength or channel characteristics are fed back by a user terminal within a coverage area or are detected by the wireless access node, and are between the wireless access node and the corresponding user terminal;

a determining module 23, configured to determine access indication information of the user terminal according to the pilot signal strength or channel characteristics, where the access indication information of the user terminal includes an identifier of the wireless access node connected with the user terminal and a corresponding coding and modulation scheme; and a sending module 25, configured to send the identifier of the wireless access node connected with the user terminal and the corresponding coding and modulation scheme to the corresponding user terminal through the wireless access node.

Further, the determining module 23 may include:

a determining submodule 231, configured to determine, according to the pilot signal strength, interference strength or channel characteristics of the signal sent by the wireless access node to the user terminal; and calculate a sum of interference strength to other user terminals than a target user terminal when each candidate wireless access node sends a signal to the target user terminal, select a candidate wireless access node corresponding to the smallest value of the sum of the interference strength as a target wireless access node which provides a downlink service for the target user terminal, and determine the identifier of the target wireless access node and the corresponding coding and modulation scheme; and/or a second determining submodule 233, configured to determine, according to the channel characteristics, the signal interference strength or channel characteristics of the user terminal received by the wireless access node; and when a target user terminal sends a signal to each candidate wireless access node, calculate a sum of interference strength to other wireless access nodes than the candidate wireless access node, select a candidate wireless access node corresponding to the smallest value of the sum of the interference strength as a target wireless access node which provides an uplink service for the target user terminal, and determine the identifier of the target wireless access node and the corresponding coding and modulation scheme.

Specifically, in a grid wireless access system where wireless access nodes in micro cells of a small radius are close to each other, in case of downlink transmission, the receiving module 21 of the central processing node may receive the pilot signal strength sent by the wireless access node, where the pilot signal strength is fed back by the user terminal within the coverage range and is between the wireless access node and the corresponding user terminal. Then, the first determining submodule 231 of the determining module 23 determines, according to the pilot signal strength, interference strength or channel characteristics of the signal sent by the wireless access node to the user terminal; and calculates a sum of interference strength to other user terminals than the target user terminal when each candidate wireless access node sends a signal to the target user terminal, selects the candidate wireless access node corresponding to the smallest value of the sum of the interference strength as a target wireless access node which provides a downlink service for the target user terminal, and determines the identifier of the target wireless access node and the corresponding coding and modulation scheme. The sending module 25 sends the identifier of the wireless access node, namely, the target wireless access node, which is connected with the user terminal, and the corresponding coding and modulation scheme to the corresponding user terminal through the wireless access node.

In case of uplink transmission, the receiving module 21 of the central processing node may receive the channel characteristics that are sent by the wireless access node and are detected according to the pilot signal of the user terminal. Then, the second determining submodule 233 of the determining module 23 determines, according to the channel characteristics, the interference strength of the signal received by the wireless access node from the user terminal; and when the target user terminal sends a signal to each candidate wireless access node, calculates a sum of interference strength to other wireless access nodes than the candidate wireless access node, selects the candidate wireless access node corresponding to the smallest value of the sum of the interference strength as a target wireless access node which provides an uplink service for the target user terminal, and determines the identifier of the target wireless access node and the corresponding coding and modulation scheme. The sending module 25 sends the identifier of the wireless access node, namely, the target wireless access node, which is connected with each user terminal, and the corresponding coding and modulation scheme to the corresponding user terminal through the wireless access node.

In the grid wireless access system where wireless access nodes in micro cells of a small radius are close to each other in the embodiment, after the receiving module of the central processing node receives the pilot signal strength or channel characteristics between the wireless access node and the corresponding user terminal within the coverage area, the determining module may allocate appropriate wireless access nodes and corresponding modulation and coding schemes to different user terminals according to the pilot signal strength or channel characteristics, which may reduce the interference between neighboring wireless access nodes or neighboring user terminals, give full play to advantages of the micro cells of a small radius, and provide higher system bandwidth.

Figure 10:
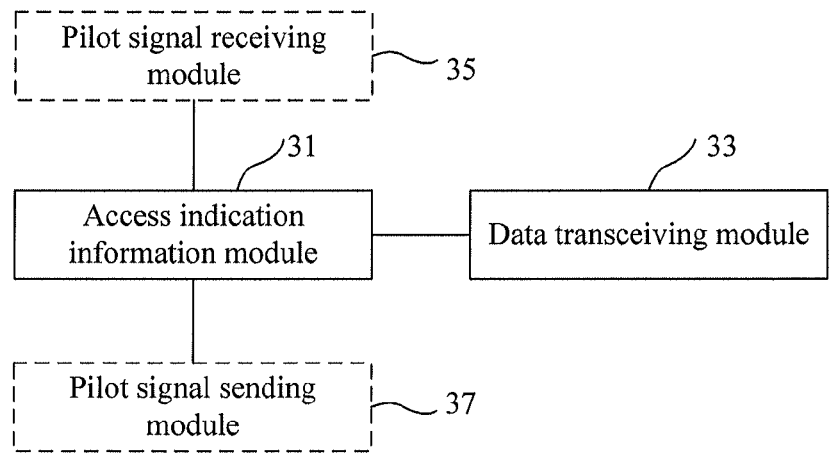
FIG. 10 is a schematic structural diagram of an embodiment of a user terminal according to the present invention.

FIG. 10 is a schematic structural diagram of an embodiment of a user terminal according to the present invention. As shown in FIG. 10, the user terminal may include:

an access indication information module 31, configured to receive access indication information, which is returned by a wireless access node and is determined by a central processing node according to pilot signal strength or channel characteristics between the home wireless access node and the corresponding user terminal, where the access indication information includes an identifier of the wireless access node connected with the user terminal and a corresponding coding and modulation scheme; and a data transceiving module 33, configured to send or receive service data to or from the wireless access node corresponding to the identifier of the wireless access node according to the identifier of the wireless access node connected with the user terminal and the corresponding coding and modulation scheme.

Further, the user terminal includes:

a pilot signal receiving module 35, configured to receive a pilot signal that is sent by broadcast by the home wireless access node, and return the pilot signal strength between the wireless access node and the corresponding user terminal; or a pilot signal sending module 37, configured to send a pilot signal to the home wireless access node by broadcast, so that the wireless access node detects the channel characteristics of the user terminal according to the pilot signal.

Specifically, in case of downlink transmission, after the pilot signal receiving module 35 of the user terminal receives the pilot signal that is sent by broadcast by the home wireless access node, for example, a base station, an antenna, a relay station, a repeater, or different virtual base stations formed by the same base station through the beams of a smart antenna, the pilot signal receiving module 35 may return the pilot signal strength or channel characteristics between the wireless access node and the corresponding user terminal. The pilot signal strength or channel characteristics returned by each user terminal to the home wireless access node may be pilot signal strength or channel characteristics between the wireless access node and the corresponding user terminal, or may be pilot signal strength or channel characteristics between all home wireless access nodes of the user terminal and the corresponding user terminal. Then, the wireless access node in a network may send the received pilot signal strength or channel characteristics to the central processing node, and the central processing node determines the corresponding access indication information according to the pilot signal strength or channel characteristics corresponding to each user terminal. The access indication information of the user terminal includes: an identifier of the wireless access node connected with the user terminal and a corresponding coding and modulation scheme, where the identifier of the wireless access node may be a base station identifier, an antenna identifier, a relay station identifier, a repeater identifier, or identifiers of different virtual base stations formed by the same base station through the beams of a smart antenna. After the access indication information module 31 of the user terminal receives the access indication information through the wireless access node, the data transceiving module 33 may send or receive service data to or from the wireless access node corresponding to the identifier of the wireless access node according to the identifier of the wireless access node and the corresponding coding and modulation scheme.

In case of uplink transmission, after the pilot signal sending module 37 of the user terminal sends the pilot signal to the home wireless access node by broadcast, the wireless access node may detect the pilot signal strength or channel characteristics between the wireless access node and the corresponding user terminal according to the pilot signal of the user terminal. Then, the wireless access node sends the pilot signal strength or channel characteristics between the wireless access node and the corresponding user terminal to the central processing node, and the central processing node determines the corresponding access indication information according to the pilot signal strength or channel characteristics between each wireless access node and the corresponding user terminal. After the access indication information module 31 of the user terminal receives the access indication information through the wireless access node, the data transceiving module 33 may send or receive service data to or from the wireless access node corresponding to the identifier of the wireless access node according to the identifier of the wireless access node and the corresponding coding and modulation scheme.

In the grid wireless access system where the wireless access nodes in micro cells of a small radius are close to each other in the embodiment, the central processing node may allocate appropriate wireless access nodes and corresponding modulation and coding schemes to different user terminals according to the pilot signal strength or channel characteristics; after the access indication information module receives the identifier of the wireless access node connected with the user terminal and the corresponding coding and modulation scheme through the wireless access node, the data transceiving module may receive and send data according to the identifier of the wireless access node connected with the user terminal and the corresponding coding and modulation scheme, which may reduce the interference between neighboring wireless access nodes or neighboring user terminals, give full play to advantages of the micro cells of a small radius, and provide higher system bandwidth.

Figure 11:
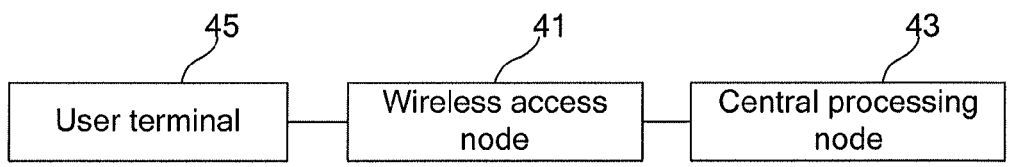
FIG. 11 is a schematic structural diagram of an embodiment of a wireless access system according to the present invention.

FIG. 11 is a schematic structural diagram of an embodiment of a wireless access system according to the present invention. As shown in FIG. 11, the wireless access system may include:

a wireless access node 41, a central processing node 43, and a user terminal 45 of any structure in the above embodiments.

Specifically, a wireless access system is a grid wireless access system where wireless access nodes in micro cells of a small radius are close to each other. In case of downlink transmission, after the wireless access node 41, for example, a base station, an antenna, a relay station, a repeater, or different virtual base stations formed by the same base station through the beams of a smart antenna, sends a pilot signal by broadcast to the user terminal 45 that is within the coverage area, if the wireless access node 41 receives pilot signal strength or channel characteristics, which are returned by the user terminal 45 and are between the wireless access node and the corresponding user terminal, the wireless access node 41 may send the pilot signal strength or channel characteristics between the wireless access node and the corresponding user terminal to the central processing node 43. The pilot signal strength or channel characteristics returned by each user terminal to the home wireless access node may be pilot signal strength or channel characteristics between the wireless access node and the corresponding user terminal, or may be pilot signal strength or channel characteristics between all home wireless access nodes of the user terminal and the corresponding user terminal. The central processing node 43 may determine the access indication information of the user terminal according to each of the pilot signal strength or channel characteristics, and send the access indication information to the wireless access node 41, and the wireless access node 41 may send the identifier of the wireless access node connected with the user terminal and the corresponding coding and modulation scheme to the corresponding user terminal 45. The access indication information of the user terminal includes: an identifier of the wireless access node connected with the user terminal and a corresponding coding and modulation scheme, where the identifier of the wireless access node may be a base station identifier, an antenna identifier, a relay station identifier, a repeater identifier, or identifiers of different virtual base stations formed by the same base station through the beams of a smart antenna. Then, the user terminal 45 sends service data to the wireless access node 41 according to the identifier of the wireless access node connected with the user terminal and the corresponding coding and modulation scheme.

In case of uplink transmission, after the wireless access node 41 receives the pilot signal that is sent by broadcast by the user terminal 45 that is within the coverage area, the wireless access node 41 may detect the pilot signal strength or channel characteristics between the wireless access node and the corresponding user terminal according to the pilot signal of the user terminal, and then send the channel characteristics of the user terminal to the central processing node 43. The central processing node 43 may determine the access indication information of the user terminal according to the pilot signal strength or channel characteristics between the wireless access node and the corresponding user terminal, and send the access indication information to the wireless access node 41; the wireless access node 41 may send the identifier of the wireless access node connected with the user terminal and the corresponding coding and modulation scheme to the corresponding user terminal 45. Then, the user terminal 45 sends service data to the wireless access node 41 according to the identifier of the wireless access node connected with the user terminal and the corresponding coding and modulation scheme.

In a grid wireless access system where wireless access nodes in micro cells of a small radius are close to each other in the embodiment, the central processing node may determine the access indication information of the user terminal according to pilot signal strength or channel characteristics and thus allocate appropriate wireless access nodes and corresponding modulation and coding schemes to different user terminals, which may reduce the interference between neighboring wireless access nodes or neighboring user terminals, give full play to advantages of the micro cells of a small radius, and provide higher system bandwidth.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not cause the essence of corresponding technical solutions to depart from the idea and scope of the present invention.

What is claimed is:

1. A wireless access method, comprising:
sending by each respective wireless access node among a plurality of wireless access nodes which form a single cell coverage area, corresponding pilot signal strength or channel characteristics which are between the respective wireless access node and a corresponding user terminal within the single cell coverage area, to a central processing node within the single cell coverage area, such that the respective wireless node is being designated as a selected wireless access node to service a particular user terminal among a plurality of other user terminals within the single cell coverage area, wherein before the sending of the pilot signal strength or channel characteristics to the central processing node within the single cell coverage area, which the pilot signal strength or channel characteristics are between the wireless access node and the corresponding user terminal are fed back by the user terminal within the single cell coverage area of the wireless access node, the method comprises:

sending a pilot signal to the user terminal within the single cell coverage area by broadcast; and receiving the pilot signal strength or channel characteristics, which are returned by the user terminal and are between the wireless access node and the corresponding user terminal within the single cell coverage; or receiving a pilot signal sent by the user terminal within the single cell coverage area by broadcast, and detecting the pilot signal strength or channel characteristics between the wireless access node and the corresponding user terminal, wherein:

the corresponding pilot signal strength or channel characteristics are fed back to the respective wireless access node by the corresponding user terminal within the single cell coverage area, the respective wireless access node is selected by the central processing node within the single cell coverage area to connect with a particular user terminal based on the respective wireless access node receiving respective pilot signal strengths from all other plurality of user terminals within the single cell coverage area;

upon the respective wireless access node being selected, receiving by the selected wireless access node, access indication information of the particular user terminal fed back by the central processing node, wherein the access indication information of the particular user terminal is determined by the central processing node according to the received corresponding pilot signal strength or channel characteristics, wherein the access indication information of the particular user terminal comprises: an identifier of the selected wireless access node connected with the particular user terminal within the single cell coverage area and a corresponding coding and modulation scheme for the particular user terminal; and sending by the selected wireless access node, the identifier of the selected wireless access node connected with the particular user terminal and the corresponding coding and modulation scheme to the particular user terminal within the single cell coverage area.

2. A wireless access method, comprising a central processing node within a single cell coverage area, performing:

receiving pilot signal strength or channel characteristics sent by a wireless access node among a plurality of wireless access nodes which form a single cell coverage area, wherein the pilot signal strength or channel characteristics are between the wireless access node and the corresponding user terminal, are fed back by a user terminal within the single cell coverage area which are detected by the wireless access node, wherein the wireless access node connected with the user terminal is selected by the central processing node based on the respective pilot signal strength received from the other plurality of user terminals within the single cell coverage area;

determining access indication information of the user terminal according to the pilot signal strength or channel characteristics within the single cell coverage area, wherein the access indication information of the user terminal comprises: an identifier of the selected wireless access node connected with the user terminal within the single cell coverage area and a corresponding coding and modulation scheme for the user terminal, wherein the determining of the access indication information of the user terminal according to the pilot signal strength or channel characteristics comprises:

determining, according to the pilot signal strength or the channel characteristics, interference strength of a signal sent by the wireless access node to the user terminal within the single cell coverage area; and calculating a sum of interference strength to other user terminals than a target user terminal when each candidate wireless access node sends a signal to the target user terminal within the single cell coverage area, selecting a candidate wireless access node corresponding to a smallest value of the sum of interference strength as a target wireless access node which provides a downlink service for the target user terminal within the single cell coverage area, and determining an identifier of the target wireless access node and the corresponding coding and modulation scheme; or determining, according to the pilot signal strength or the channel characteristics, interference strength of a signal received by the wireless access node from the user terminal; and when the target user terminal sends a signal to each candidate wireless access node within the single cell coverage area, calculating a sum of interference strength to other wireless access nodes than the candidate wireless access node within the single cell coverage area, selecting a candidate wireless access node within the single cell coverage area corresponding to a smallest value of the sum of interference strength as a target wireless access node which provides an uplink service for the target user terminal, and determining an identifier of the target wireless access node and the corresponding coding and modulation scheme; and sending through the wireless access node, the identifier of the selected wireless access node connected with the user terminal within the single cell coverage area and the corresponding coding and modulation scheme to the corresponding user terminal.

3. A wireless access method, comprising by a user terminal within a single cell coverage area, performing:

receiving access indication information, which is returned through a wireless access node among a plurality of wireless access nodes which form the single cell coverage area, and the access indication information is determined by a central processing node within the single cell coverage area according to pilot signal strength or channel characteristics between the wireless access node and a corresponding user terminal within the single cell coverage area, wherein the access indication information comprises: an identifier of the wireless access node connected with the user terminal and a corresponding coding and modulation scheme for the user terminal, wherein the wireless access node connected with the user terminal is selected by the central processing node within the single cell coverage area based on the respective pilot signal strength received from other plurality of user terminals, wherein before the receiving of the access indication information which is returned by the wireless access node and is determined by the central processing node according to the pilot signal strength or channel characteristics between the home wireless access node and the corresponding user terminal within the single cell coverage area, the method comprises:

receiving a pilot signal sent by the home wireless access node by broadcast, and returning the pilot signal strength or channel characteristics between the wireless access node and the corresponding user terminal; or sending a pilot signal to the home wireless access node by broadcast, so that the wireless access node detects the pilot signal strength or signal characteristics between the wireless access node and the corresponding user terminal within the single cell coverage area according to the pilot signal; and sending or receiving service data to or from the selected wireless access node corresponding to the identifier of the selected wireless access node according to the identifier of the selected wireless access node connected with the user terminal within the single cell coverage area and the corresponding coding and modulation scheme.

4. A wireless access node, the wireless access node being among a plurality of wireless access nodes which form a single cell coverage area, wherein the wireless access node comprising at least a processor which executes program codes, which configure the wireless access node to:

send pilot signal strength or channel characteristics to a central processing node within the single cell coverage area, where the pilot signal strength or channel characteristics are between the wireless access node and the corresponding user terminal, and the pilot signal strength or channel characteristics are fed back by a user terminal within the single cell coverage area of the wireless access node, wherein the wireless access node connected with the user terminal is selected by the central processing node based on the respective pilot signal strength received from other plurality of user terminals within the single cell coverage area;

send a pilot signal to the user terminal within the single cell coverage area by broadcast; and receive the pilot signal strength or channel characteristics, which are returned by the user terminal and are between the wireless access node and the corresponding user terminal within the single cell coverage area; or receive a pilot signal sent by the user terminal within the single cell coverage area by broadcast; and detect the pilot signal strength or channel characteristics between the wireless access node and the corresponding user terminal according to the pilot signal of the user terminal within the single cell coverage area;

receive access indication information of the user terminal, which is fed back by the central processing node within the single cell coverage area, and the received access indication information of the user terminal is determined according to the pilot signal strength or channel characteristics, wherein the access indication information of the user terminal comprises: an identifier of the selected wireless access node connected with the user terminal within the single cell coverage area and a corresponding coding and modulation scheme for the user terminal; and send the identifier of the selected wireless access node connected with the user terminal and the corresponding coding and modulation scheme to the corresponding user terminal within the single cell coverage area.

5. A central processing node within a single cell coverage area, comprising at least a processor which executes program codes, which configure the central processing node to:

receive a respective pilot signal strength or channel characteristics sent by a plurality of wireless access nodes within the single cell coverage area, wherein the respective pilot signal strength or channel characteristics are received from a plurality of user terminals within the single cell coverage area of each of the plurality of wireless access nodes;

determine access indication information of one particular user terminal out of the plurality of user terminals within the single cell coverage area according to the pilot signal strength or the channel characteristics, wherein the access indication information of the one particular user terminal comprises: an identifier of the wireless access node connected with the one particular user terminal within the single cell coverage area and a corresponding coding and modulation scheme for the one particular user terminal;

select one of the plurality of wireless access nodes for communicating data with the one particular user terminal within the single cell coverage area, wherein the selecting of the wireless access nodes is based on the respective pilot signal strength received from other plurality of user terminals within the single cell coverage area;

determine a respective sum of the respective pilot signal strength received from each of the plurality of access nodes within the single cell coverage area, and to select a one of the plurality of access nodes corresponding to the smallest determined respective sum; and send the identifier of the selected wireless access node connected with the one particular user terminal within the single cell coverage area and the corresponding coding and modulation scheme to the corresponding one particular user terminal through the selected wireless access node.

6. A method for selecting an access node from a plurality of access nodes within a single cell coverage area for communicating service data with one particular user equipment out of a plurality of user equipment within the single cell coverage area, the method comprising:

based on respective interference signal strengths measured by the selected access node on each of the other plurality of user equipment within the single cell coverage area, wherein the respective interference signal strengths are measured based on communication between the one particular user equipment and each of the plurality of access nodes within the single cell coverage area, selecting an access node that produces the smallest sum of interference signal strengths measured from all the other plurality of user equipment while the selected access node communicating service data with the one particular user equipment within the single cell coverage area; wherein the selecting of the access node is in response to receiving a respective interference signal strength for each of the other user equipment from each of the plurality of access nodes within the single cell coverage area, wherein the selecting of the access node is in response to receiving a respective interference signal strength for each of the other user equipment from each of the plurality of access nodes within the single cell coverage area comprises;

determining a respective sum of the interference signal strengths received from each of the plurality of access nodes within the single cell coverage area; and selecting the one of the plurality of access nodes within the single cell coverage area corresponding to the smallest determined respective sum.

7. The method of claim 6 further comprises communicating to the UE an identifier corresponding to the identified one of the plurality of access nodes within the single cell coverage area.

8. A method for selecting an access node from a plurality of access nodes within a single cell coverage area, wherein the selected access node is for communicating with a particular one user equipment out of a plurality of user equipment within the single cell coverage area, the method comprising a central processing node within the single cell coverage area, performing:

receiving from each of the plurality of access nodes a respective interference signal strength from all other plurality of user equipment within the single cell coverage area, wherein the respective interference signal strength are measured by each of the plurality of access nodes based on data communication between the plurality of access nodes and all other plurality of user equipment within the single cell coverage area;

determining a respective sum of the respective interference signal strengths received from each of the plurality of access nodes within the single cell coverage area;

identifying one out of the plurality of access nodes within the single cell coverage area having the smallest determined respective sum of the respective interference signal strengths being the selected access node, and;

selecting the identified selected access node for communicating with the particular user equipment within the single cell coverage area.

9. A system for selecting an access node within a single cell coverage area for communicating service data with one particular user terminal out of a plurality of user terminals within a single cell coverage area, the system comprising:

a central processing node; and a plurality of wireless access nodes coupled to the plurality of user terminals including the one particular user terminal within the single cell coverage area, wherein the central processing node within the single cell coverage area is configured to:

receive from each of the plurality of access nodes a respective interference signal strength from all the other plurality of user terminals within the single cell coverage area, wherein the respective interference signal strength are measured by each of the plurality of access nodes based on data communication between the plurality of access nodes and all other plurality of user equipment within the single cell coverage area, determine a respective sum of the respective interference signal strengths received from each of the plurality of access nodes within the single cell coverage area, identify one out of the plurality of access nodes having the smallest determined respective sum of the respective interference signal strengths being a selected access node within the single cell coverage area, and select the identified selected access node for communicating with the one particular user equipment within the single cell coverage area.

\* \* \* \* \*